(12) United States Patent
Specht

(10) Patent No.: US 9,878,856 B2
(45) Date of Patent: Jan. 30, 2018

(54) TRANSFERRING ASSEMBLY FOR CONVEYING SYSTEMS

(71) Applicant: AVANCON SA, Riazzino (CH)

(72) Inventor: Dieter Specht, Arcegno (CH)

(73) Assignee: AVANCON SA, Riazzino (CH)

( * ) Notice: Subject to any disclaimer, the term of this patent is extended or adjusted under 35 U.S.C. 154(b) by 0 days.

(21) Appl. No.: 15/113,284

(22) PCT Filed: Feb. 9, 2015

(86) PCT No.: PCT/IB2015/050953
§ 371 (c)(1),
(2) Date: Jul. 21, 2016

(87) PCT Pub. No.: WO2015/121786
PCT Pub. Date: Aug. 20, 2015

(65) Prior Publication Data
US 2016/0340131 A1    Nov. 24, 2016

(51) Int. Cl.
*B65G 13/10*        (2006.01)
*B65G 13/02*        (2006.01)
(Continued)

(52) U.S. Cl.
CPC ............ *B65G 47/54* (2013.01); *B65G 13/02* (2013.01); *B65G 13/10* (2013.01); *B65G 47/648* (2013.01); *B65G 2207/18* (2013.01)

(58) Field of Classification Search
CPC ........ B65G 13/10; B65G 47/54; B65G 13/02; B65G 2207/18; B65G 47/648
See application file for complete search history.

(56) References Cited

U.S. PATENT DOCUMENTS

| 3,983,988 A | 10/1976 | Maxted et al. |
| 5,012,914 A * | 5/1991 | Berends ................. B65G 13/10 198/369.4 |

(Continued)

FOREIGN PATENT DOCUMENTS

| EP | 0 956 249 B1 | 3/2001 |
| EP | 1 375 389 A1 | 1/2004 |

OTHER PUBLICATIONS

International Search Report, dated Sep. 21, 2015, from corresponding PCT application.

*Primary Examiner* — Mark A Deuble
(74) *Attorney, Agent, or Firm* — Young & Thompson

(57) ABSTRACT

A transferring assembly for displacing products conveyed by a conveying system from a primary feed direction to a secondary direction, includes: a plurality of transferring units arranged adjacent in the cross direction and adapted to form a conveying plane; each transferring unit including at least one conveying element that rotates around an axis of transversal rotation; at least one activating device of the rotation of the at least one conveying element to drive the angular rotation of the axis of transversal rotation with respect to an axis substantially orthogonal to the primary direction and the axis of transversal rotation. Each transversal rotation axis of each transferring unit is adapted to angularly rotate, with respect to an axis substantially orthogonal to the primary direction and to the axis of transversal rotation driven by the activating device, independently with respect to the transversal rotation axis of the transversally adjacent transferring unit.

17 Claims, 5 Drawing Sheets

(51) Int. Cl.
*B65G 47/54* (2006.01)
*B65G 47/64* (2006.01)

(56) References Cited

U.S. PATENT DOCUMENTS

| | | | | |
|---|---|---|---|---|
| 5,333,722 | A * | 8/1994 | Ouellette | B65G 13/10 198/436 |
| 5,577,596 | A * | 11/1996 | Van Essen | B07C 3/02 198/349 |
| 5,921,374 | A * | 7/1999 | Takino | B65G 13/10 193/35 MD |
| 6,073,747 | A * | 6/2000 | Takino | B65G 13/10 198/370.09 |
| 6,179,113 | B1 * | 1/2001 | Wunscher | B65G 13/10 198/436 |
| 7,581,632 | B2 * | 9/2009 | Wallace | B65G 47/54 198/370.08 |
| 9,499,341 | B2 * | 11/2016 | Wilkins | B65G 13/065 |
| 2003/0234155 | A1 * | 12/2003 | Kanamori | B65G 1/0478 198/394 |
| 2005/0400009 | | 2/2005 | Ehlert | |
| 2016/0145053 | A1 * | 5/2016 | Vetter | B65G 47/244 198/401 |

* cited by examiner

TRANSFERRING ASSEMBLY FOR CONVEYING SYSTEMS

FIELD OF THE INVENTION

The present invention concerns the field of conveying systems and, in particular, a transferring assembly to displace the products conveyed by the conveying system from a primary direction to a secondary direction.

KNOWN ART

Roller and/or wheel conveying systems have been known for more than a hundred years and usually they comprise a plurality of rollers and/or wheels arranged to determine a feed path for products, such as boxes, parcels, suitcases, letters or packages in general, between an operative station and the following one.

These systems have a wide area of applicability such as post offices, airports and different kinds of manufacturing or logistic industries involving the product handling among several operative stations in the production process or in the handling system thereof.

The Applicant noticed that a big problem in the field is usually represented by the complexity in displacing the conveyed products from a primary direction to a secondary direction.

For this purpose conveyors and sorting devices are used.

Such transferring systems are shown, for example, in EP0956249 or U.S. Pat. No. 3,983,988. EP0956249 describes a transferring and conveying apparatus having roller conveyors adapted to form a conveying plane to convey goods in a main conveying direction or in an auxiliary conveying direction. The apparatus comprises at least one rotating activating device and oscillating transferring means so that the roller conveyors oscillate around oscillation axes that extend perpendicularly to the conveying plane and at least one activating device of the roller and transferring means for activating the roller conveyor. Each roller conveyors being combined with a support roller that can be rotated around the oscillation axis. The activating device of the roller (drive roller 24) and the oscillating activating device (cylinder 32) are assembled on the frame of the conveyor system.

In particular, the Applicant observed that each rotating roller conveyor of a row is coupled to the drive device combined with such a row through its own motorized transferring device (driving belt 26).

Document U.S. Pat. No. 3,983,988 describes a transferring conveying apparatus having little roller conveyors that form a conveying plane and can rotate around an oscillation axis extending perpendicularly to the conveying plane for conveying to goods to be conveyed from a main conveying direction and entering and exiting along auxiliary directions. For the transport in the main conveying direction, the transferring conveying apparatus has roller conveyors driven in a frame. The rows of little roller conveyors are driven all together and it is possible to carry out an oscillation around an oscillation axis extending perpendicularly to the conveying plane. Each row being combined with a rotating unit.

However, the Applicant noticed that the known transferring systems are complex, not much reliable and usually the rotation elements are forced to move in unison all together in the cross direction.

Therefore, the direction change from a main direction to a secondary or auxiliary direction can only happen suddenly thereby involving tossing and shocks of conveyed goods against the side walls.

Therefore, the Applicant found the need of providing a new transferring assembly for displacing the products conveyed by a conveying system from a primary direction to at least one secondary direction that, in the meanwhile, is simple and easy to install and whose transferring elements are not forced to move in cross direction all together around vertical rotation axes.

SUMMARY OF THE INVENTION

Therefore, in its first aspect, the invention concerns a transferring assembly for displacing the products conveyed by a conveying system from a primary feed direction (F) to a secondary direction; said transferring assembly comprising a plurality of transferring units arranged adjacent in the transversal direction and in the axial direction and adapted to form a conveying plane; each transferring units comprising at least one conveying element that rotates around a axis of transversal rotation (X-X);

characterized in that it comprises at least one activating device of the rotation of said at least one conveying element to drive the angular rotation of said axis of transversal rotation (X-X) with respect to an axis substantially orthogonal to the primary direction and to said axis of transversal rotation (X-X) and in that each axis of transversal rotation (X-X) of each transferring unit (10) is adapted to angularly rotate, with respect to an axis substantially orthogonal to the primary direction (F) and to said axis of transversal rotation (X-X) driven by said activating device of the rotation, independently with respect to the axis of transversal rotation (X-X) of the transferring unit that is transversally adjacent; and in that each transferring unit moves together with the transfer unit adjacent in the axial direction; said activating device of the rotation of said at least one conveying element comprises:

- at least one retaining element operatively combined with said at least one conveying element;
- at least one rack and at least one gear wheel coupled to said rack;
- said gear wheel being operatively coupled to the retaining element so that the translation of said rack causes the rotation of said retaining element and, accordingly, an angular rotation of the rotating conveying element;
- at least one motor connected to said rack to drive the translation thereof.

In the present invention scope, the terms "transversal", "transversally", is substantially identified on the transferring plane in a direction substantially perpendicular to the main feed direction (F) of goods in the conveying system.

Substantially the terms "axial direction", "axially" detect, on the transferring plane, a direction substantially parallel or coincident with the main feed direction (F) of goods in the conveying system.

The present invention, in the afore said aspect, may present at least one of the preferred characteristics herein after described.

Preferably, said at least one conveying element that rotates around an axis of transversal rotation X-X comprises at least one roller rotating around said axis of transversal rotation X-X.

Conveniently, the axis of transversal rotation X-X is identified by at least one shaft of transversal rotation.

Advantageously, the transfer units adjacent in the axial direction are associated with the same rack which determines the rotation of the respective shafts.

Advantageously, the retaining element is a bracket, preferably U-shaped, and it is coupled with the transversal shaft.

Preferably, said at least one motor is a stepper motor coupled by a transmission member to the rack for the rotation of the retaining element that rotates around its own vertical axis Z-Z.

Conveniently, the transferring assembly comprises a second actuating device of the rotation of said at least one rotatable conveying element about said transverse rotation axis (X-X) comprising a rotatable supporting shaft functionally associated with said at least one conveying element and to a motor.

Preferably, said rotating support shaft is combined, by a transmission device, with said shaft of transversal rotation on which said at least one roller is keyed.

Conveniently, the transmission device comprises a first gear wheel keyed on the rotating support shaft and coupled to a second gear wheel in its turn keyed on the shaft of transversal rotation.

Preferably, the first transferring assembly of the motion in the axial direction to transfer the rotary motion of the rotating support shaft of a first transferring unit to a support shaft of a second transferring unit arranged adjacent in a direction parallel or coincident with the primary feed direction (F).

Advantageously, the first transferring assembly of the motion in the axial direction comprises:
  at least one first pulley keyed on said rotating support shaft of said first transferring unit, at least one second pulley combined with a second rotating support shaft of a transferring unit adjacent in the axial direction; and
  at least one belt and/or chain to transmit the motion from the first pulley to the second pulley.

Conveniently, the first transferring assembly of the motion in the axial direction further comprises a third and a fourth pulley:
  said first and third pulley being keyed on said rotating support shaft of a first transferring unit;
  said first pulley being combined to a second pulley of a rotating support shaft of a third transferring unit adjacent in the axial direction;
  said third pulley being combined to a fourth pulley of a rotating support shaft of a second transferring unit adjacent in the axial direction;
  said second pulley and said fourth pulley being respectively combined with two transferring units axially opposed with respect to the transferring unit comprising the first pulley and the third pulley.

Preferably, the transferring assembly comprises at least one second transferring assembly of the motion in the cross direction to transfer the rotary motion of the rotating support shaft of a first transferring unit to a support shaft of a second transferring unit arranged adjacent in the cross direction.

Advantageously, said second transferring assembly of the motion in the cross direction comprises:
  at least one fifth pulley keyed on said rotating support shaft of the first transferring unit, at least one sixth pulley combined with a second rotating support shaft of a transferring unit adjacent in the cross direction; and
  at least one belt and/or chain to transmit the motion from said fifth pulley to the sixth pulley.

BRIEF DESCRIPTION OF THE DRAWINGS

Further characteristics and advantages of the invention will be more evident from the detailed description of some preferred embodiments, but not exclusive, of a new transferring assembly for displacing the products conveyed by a conveying system from a primary direction to a secondary direction according to the present invention.

Such a description will be hereinafter explained referring to the attached drawings, provided for purposes of illustrations only, and thereby not limitative, wherein.

DETAILED DESCRIPTION OF SOME EMBODIMENTS OF THE INVENTION

Figure 1:
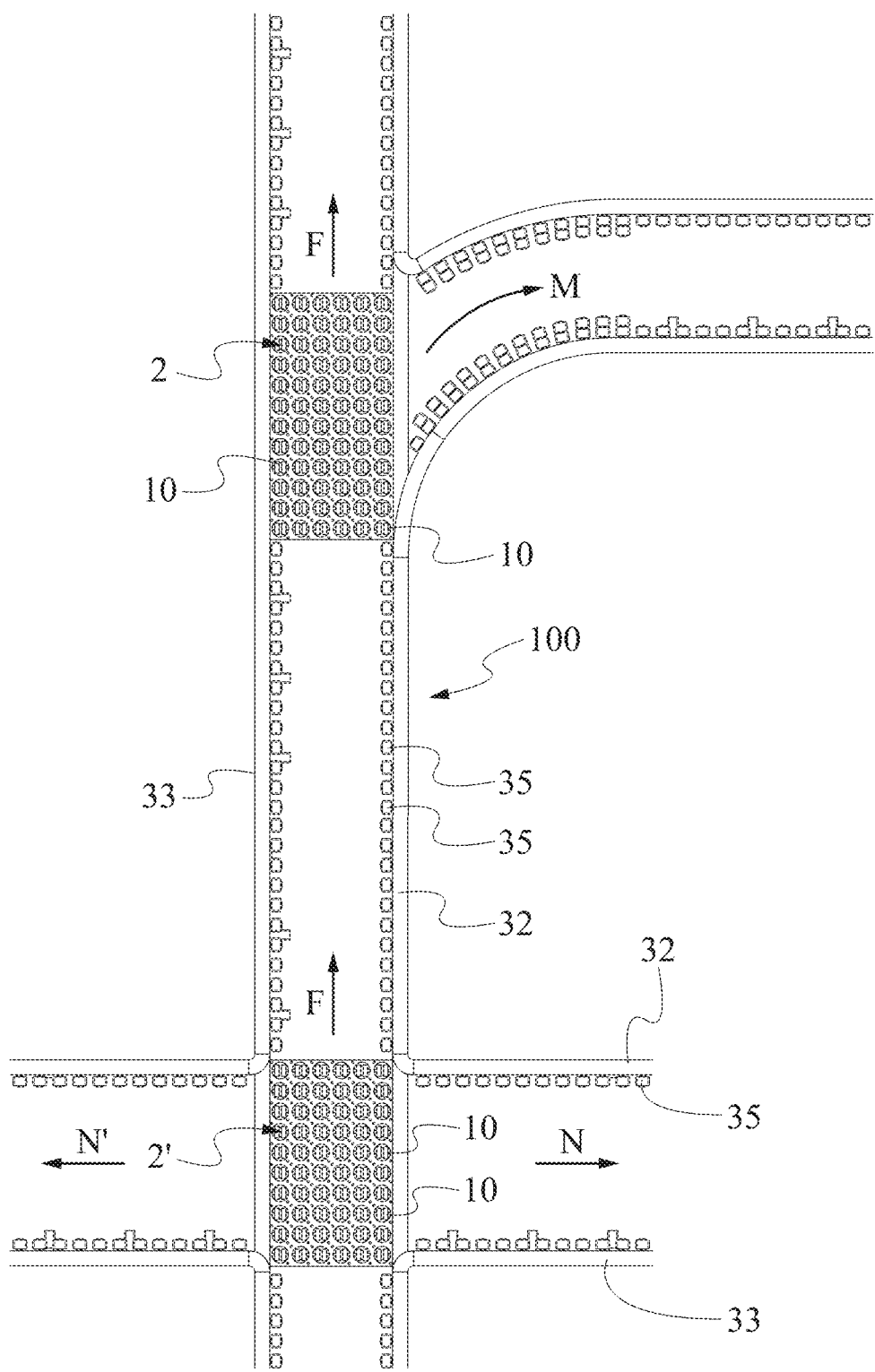
FIG. 1 is a top view of a portion of a conveying system having two transferring assemblies for displacing the products conveyed by the conveying system itself from a primary feed direction F to at least one secondary direction according to the present invention.

Referring to FIGS. 1-4, a conveying system comprising at least one transferring assembly 2, 2' for displacing the products conveyed by the conveying system itself from a primary direction to a secondary direction according to the present invention, is identified by the numeral reference 100.

The conveying system 100 can be any conveying system of known type, hereinafter in the present treatise for description needs we will refer to a conveying system of the type described, for example, in the Applications ITRM2012A000264 and ITRM2012A000452 in the name of the Applicant.

The conveying systems described in the afore mentioned applications have at least two supporting frames 32, 33 on the outside in the axial direction and extending substantially parallel in the directions F of the conveyor 100. The conveying direction, represented in figures by the arrow F, detects the extending direction of the conveyor 100 and the so-called primary feed direction of products of conveying system 100.

A plurality of driving wheels 35 or driving rollers are located between the two supporting frames 32, 33.

The driving wheels 35 or driving rollers are rotatably mounted each on a support shaft, not shown, and they are operated by respective driving assemblies and a plurality of motors.

In the embodiment shown in FIG. 1, the conveying system 100 comprises a plurality of driving wheels 35 for each supporting frame 32, 33.

In the length of the conveying system shown in FIG. 1, two omnidirectionally-transferring assemblies 2, 2' for displacing the products conveyed by the conveying system 100 from a primary direction F to at least one secondary direction, are present.

In detail, the transferring assembly 2 is able to transfer the products conveyed by the conveying system from a primary direction identified by the arrow F to a secondary direction identified by the arrow M, whereas the transferring assembly 2' is able to transfer the products conveyed by the conveying system 100 from the primary direction identified by the arrow F to two secondary directions identified by the arrows N and N' that are opposed and leaving the primary direction F.

Hereinafter we will refer to the transferring assembly 2, being understood that what mentioned goes for the transferring assembly 2' too.

The transferring assembly 2 comprises a plurality of transferring units 10, each comprising at least one conveying element, preferably at least one roller conveyor 3. The transferring units are arranged one adjacent to another both in the axial direction that coincides with the main direction F, and in the cross or transversal direction.

In the embodiment shown in FIG. 1, the transferring assembly 2 has a first plurality of transferring units 10, specifically six, arranged adjacent one to another along a direction substantially transversal to the main direction F and a second plurality of transferring units 10, specifically twelve, arranged adjacent one to another along a substantially axial direction coincident with the main direction F.

The transferring assembly 2 is then composed of an array of transferring units 10 arranged in transverse rows and axial columns.

The transferring units 10 of the second plurality are independent one from another in the cross or transversal direction but are constrained in the axial direction, namely in accordance with the direction coinciding with the main direction F.

In other terms, each transferring units 10 can have an orientation of the transversal axes of rotation X-X of its own conveyor roller 3 independent from the orientation of the transversal axes of rotation X-X of the transferring units 10 adjacent in the cross or transversal direction.

On the contrary, each transfer unit 10 has a transversal orientation of the axes of rotation X-X of its conveyor rollers 3 substantially coincident with that of the transversal axes of rotation X-X of the transfer units 10 adjacent in the axial direction.

This allows you to not have changes of direction too sudden or unnatural of goods transported that could cause shock and/or damage to the goods themselves.

In greater detail, each transferring units 10 can change the orientation of the transversal axes of rotation of its own conveyor roller 3 independently from the orientation of the axes of the transferring units 10 adjacent in the cross or transversal direction.

More in detail, the axis of transversal rotation X-X of the roller conveyor 3 of each transferring unit 10 can rotate with respect to a vertical axis in order to change its own orientation independently from the rotation of the axis of transversal rotation X-X with respect to a vertical axis of the transferring units 10 adjacent in the cross direction.

The number of transferring units 10 for the transferring assembly 2, 2' can change both in the axial direction and in the cross direction in order to fit in different conveying systems 100 and to meet the sorting directions of goods of these system.

The number of transferring units 10 for the transferring assembly 2, 2' can change both in the axial direction and in the cross direction in function of the size of the goods to be transported.

Each transferring units 10 comprises a first housing body 20 comprising at least one, preferably two, conveyor rollers 3,3' adapted to rotate around a transversal shaft 4 identifying the axis of transversal rotation X-X.

The conveyor rollers 3,3' comes out at least partially from an upper opening 21 of the first housing body 20. The first housing body 20 has a parallelepiped-like box shape, preferably made of polymeric material, such as for example polyamide.

The conveyor rollers 3,3' are coupled with a rotating support shaft 6 through a transmission device, as better described in the following.

The rotating support shaft 6 is in its turn driven by an activating device of the orientation of the conveyor roller 3.

The conveyor rollers 3,3' are angularly orientable with respect to an vertical axis substantially orthogonal to the to the primary direction (F) and to said axis of transversal rotation X-X by means of an suitable activating device of the orientation of the conveyor rollers 3,3'.

The activating device of the orientation of the conveyor roller 3 is responsible for the orientation of the conveyor rollers 3,3' of the single transferring unit 10 with respect to the main direction F of the conveying system 100.

For this purpose, the activating device of the orientation of the conveyor rollers 3,3' controls the inclination of the transversal shaft 4 with respect to the main direction F.

The activating device of the orientation of the conveyor roller 3 comprises at least a retaining element 26, operatively coupled to the conveyor rollers 3,3', at least one rack 8 and at least one gear wheel 7 coupled to said rack 8.

The retaining element 26, preferably is a U-shaped bracket, the free ends of which are engaged with the transversal shaft 4 on which is keyed in a rotatable way the conveyor rollers 3,3'.

Figure 4:
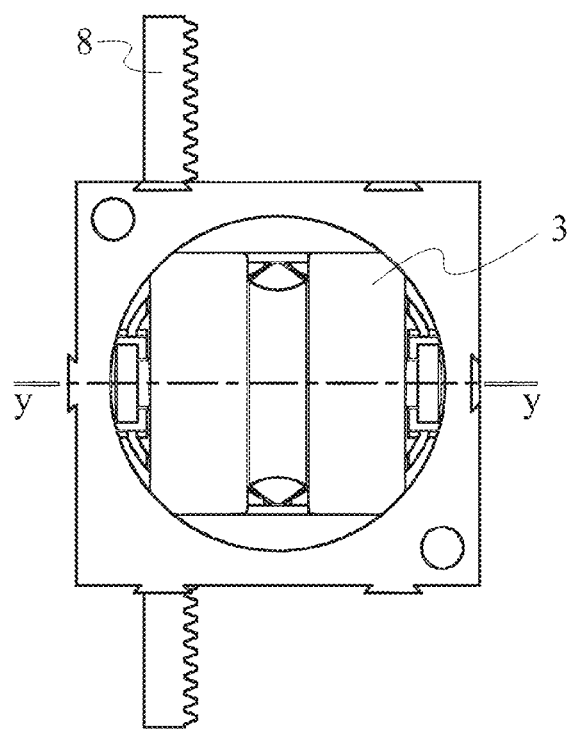
FIG. 4 is a schematic top view of the transfer unit of FIG. 2.

In the embodiment shown in FIG. 4, it is shown how the conveyor rollers 3,3' are supported through the shaft 4 by a U-shaped retaining bracket 26 engaging the axially opposed ends of the shaft 4 through the precision bearings 27.

The retaining bracket 26, in the embodiment shown in FIG. 4, is made of polymeric material, preferably of polyoxymethylene.

The retaining bracket 26 is housed at least partially in the first housing body 20 and has a hollow shank 28 coaxially placed outside of the rotating support shaft 6, The gear wheel 7 is coupled to the retaining bracket 26 so that the translation of the rack 8 causes the rotation of the retaining bracket 26 of each transferring unit 10 and, consequently, an angular rotation of the rotation axis 4 of the conveyor rollers 3,3'.

A rotation of the retaining bracket 26 causes an angular rotation of the shaft 4 and consequently of the conveyor rollers 3,3' around a vertical axis z-z identified by the rotating support shaft 6.

The translatory movement of the rack 8 is in its turn driven by a motor connected to the rack 8.

The same rack 8 is connected to all the transfer units 10 adjacent in the axial direction, namely in accordance with the main direction of feed F, in this way all the shafts 4 of the transfer unit 10 adjacent in the axial direction have an orientation substantially coinciding.

Each row of transfer units 10 adjacent in the axial direction has the same rack 8.

To orient all the shafts 4 of the same axial row of transfer units 10 adjacent in the axial direction is necessary therefore also only one motor.

Each gear wheel 7 and the rack 8 are partially contained in a parallelepiped-like box shaped element 70 having two windows 71 opposed in the axial direction in order to allow the rack 8 to come out and come back in its translatory movement in the axial direction.

The box-shaped element 70 has a central hole for the shaft 6.

The box-shaped element 70 is preferably made of polymeric material, such as for example polyamide.

The box-shaped element 70 is adapted to removably couple with the box-shaped element 20.

Figure 5A:
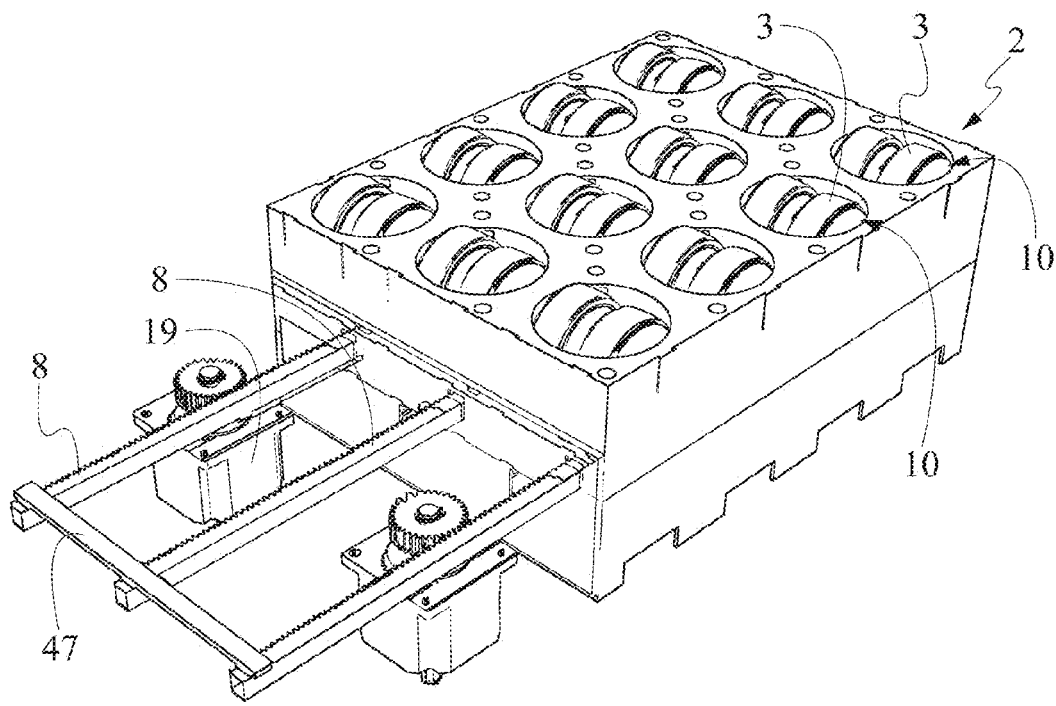
FIGS. 5a and 5b show the activating device of the transferring unit for displacing the products conveyed by the conveying system itself from a primary direction to a secondary direction according to the present invention.
Figure 5B:
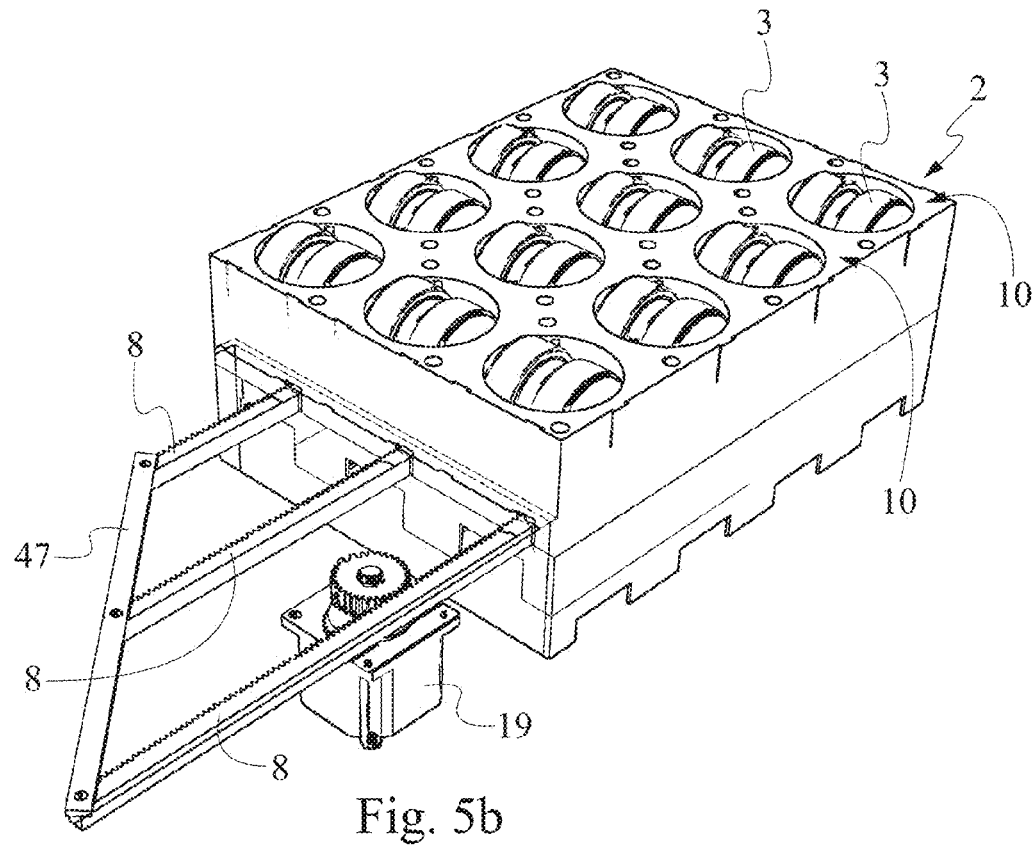

The conveying units 10 adjacent in the axial direction, i.e. in the way of the primary direction F, have the same rack 8 as shown in FIGS. 5a and 5b.

The rack 8 of each row of transferring units 10 adjacent in the axial direction is combined with various gear wheels 7, each combined with a retaining element 26. In the embodiment shown in FIGS. 5a, 5b, the motor 19 driving the rack 8, is a stepper motor in its turn controlled by an electronic control unit, hot shown.

Alternatively the motor 19 can be a linear motor or a pneumatic cylinder or another type of motor means without departing from the scope of protection of the present invention.

Only one motor 8 can be sufficient to move all the racks 8, as shown in FIG. 5a, or there can be several motor 19 one for each rack 8, as shown in FIG. 5b.

The racks 8 can be joined by transversal bars 17 that are orthogonal to the racks, FIG. 5b, or tilted with respect to the racks 8, FIG. 5a. As mentioned previously, the conveyor rollers 3,3' are associated by means of a transmission device to a rotatable support shaft 6 is in turn connected to an electric motor not shown in the figure preferably disposed below each transferring assembly 10,10'.

Figure 3:
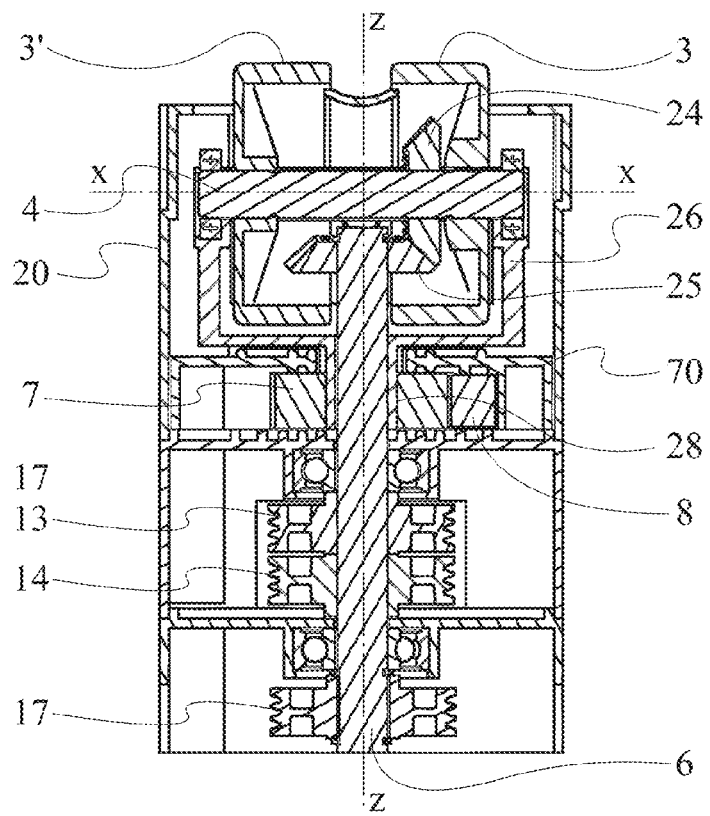
FIG. 3 is a sectioned schematic view of the transferring unit of FIG. 2.

In the embodiment shown in FIG. 3 the transmission device between said rotatable support shaft 6 and said rotation shaft 4 on which said rollers 3,3' are keyed, comprises a first conical gear wheel 24 keyed on said shaft 4, the gear wheel being coupled to a second gear wheel 25 keyed on the rotating shaft 6.

The first gear wheel 24 is integral with the rollers 3,3'.

Figure 2:
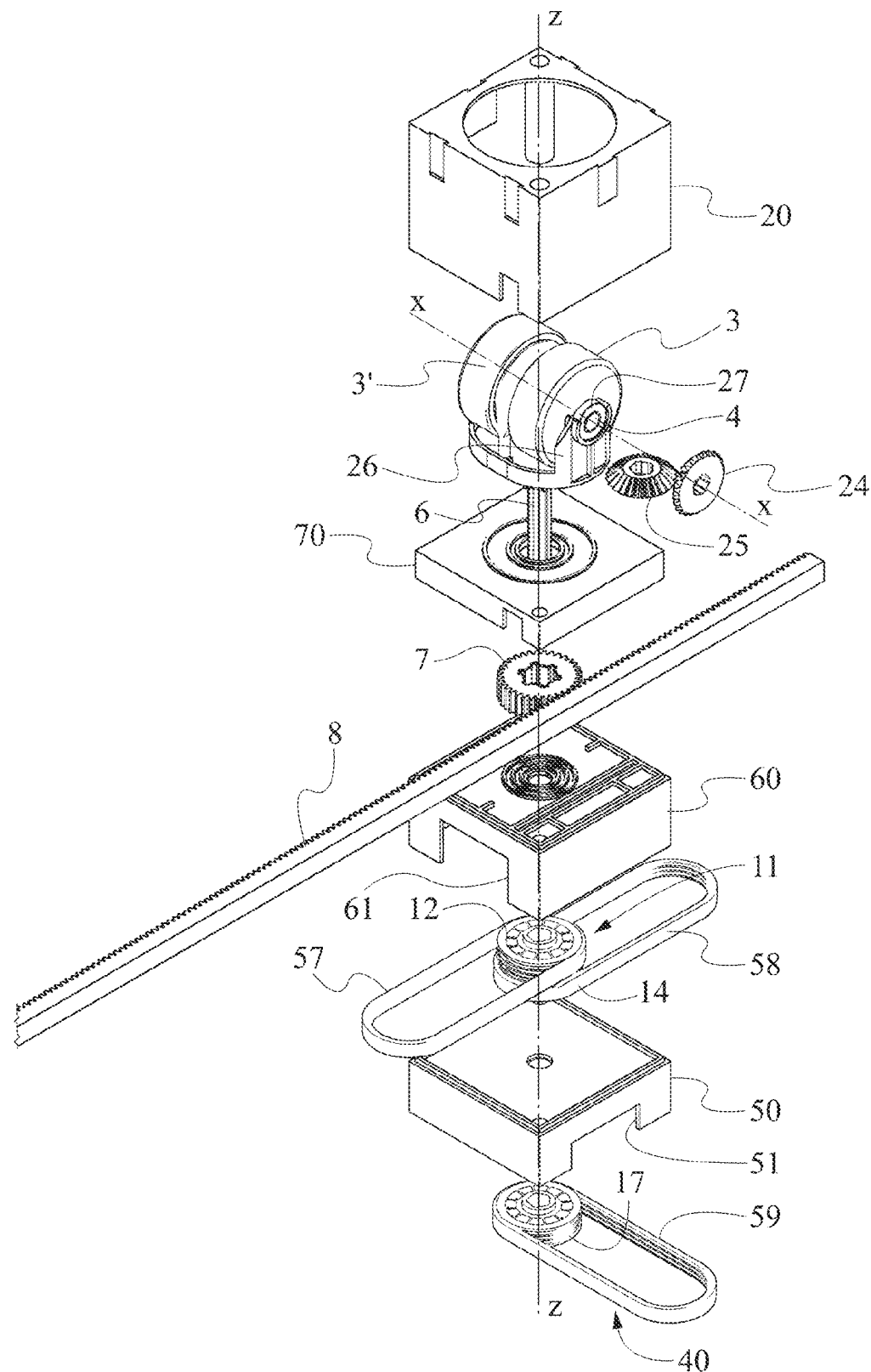
FIG. 2 is an exploded schematic view of a transferring unit according to the present invention.

In the embodiment shown in FIG. 2, the two gear wheels 24, 25 are made of polymeric material, preferably of polyamide PA 6.6.

The two gear wheels 24, 25 are contained inside the first housing body 20.

Each transferring assembly 10 comprises at least one transferring assembly 11 of the motion in the cross direction to transfer the rotary motion of the rotating support shaft 6 to a second support shaft 6 of a second transferring unit 10 arranged adjacent in the cross direction.

The transferring device 11 of the motion in the axial direction has at least one first pulley 12 keyed on the rotating support shaft 6 of a first transferring unit 10.

At least one second pulley 12' combined with a second rotating support shaft 6 of a transferring unit 10 adjacent in the axial direction.

Figure 6A:
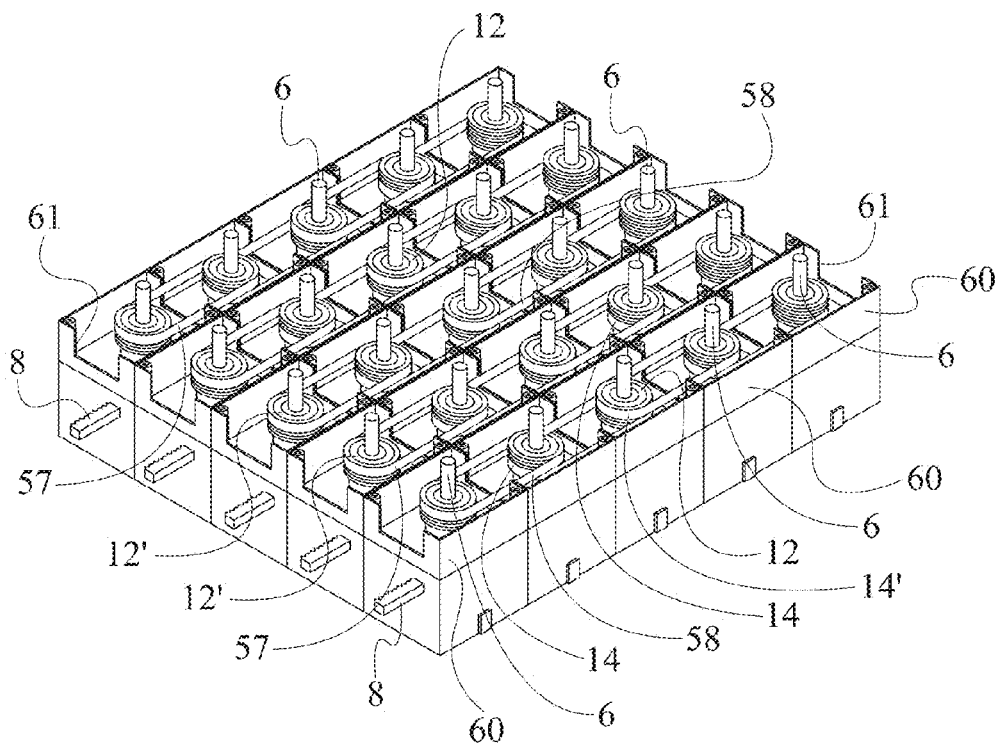
FIGS. 6a and 6b are schematic top views rotated of 180° of a transferring group according the invention, in the FIG. 6a in particular is shown a first transferring assembly of the motion in the axial direction to transfer the rotary motion of the rotary support in axial direction and in FIG. 6b is shown a second transferring assembly to transfer the motion in the transverse direction.

A belt and/or chain to transmit the motion from said first pulley 12 to said second pulley 13, as shown in FIG. 6a.

Advantageously, the first and the second pulleys 12, 12' are made of polymeric material, preferably of polyamide.

The first 12 and the second 12' pulleys, in the embodiment shown in figures, are adapted to couple with a so-called multi-V belt.

Precisely, the belt is advantageously a so-called multi-V belt.

The first transferring assembly 11 of the motion in the axial direction further comprises a third pulley 14 and a fourth pulley 14'.

Advantageously, also the third pulley 14 and the fourth pulley 14' are made of plastics, preferably of polyamide.

The third pulley 14 and the fourth pulley 14', in the embodiment shown in figures, are adapted to couple with a so-called multi-V belt.

The first pulley 12 and third pulley 14 are keyed on the rotating support shaft 6 of a first transferring unit 10.

The first pulley 12 being combined to a second pulley 12' of a rotating support shaft 6 of a transferring unit 10 adjacent in the axial direction.

The third pulley 14 being combined to a fourth pulley 14' of a rotating support shaft 6 of a transferring unit 10 adjacent in the axial direction.

The second pulley 12' and the fourth pulley 14' being respectively combined with two transferring units 10 axially opposed with respect to the transferring unit comprising the first pulley 12 and the third pulley 14.

The first transferring assembly 11 of the motion in the axial direction is contained in a parallelepiped-like box shaped element 60 and has two windows 61 opposed in the axial direction to allow the drive belts to come out and come back.

The box-shaped element 60 has a central hole for the shaft 6 and a precision bearing coupled with the shaft 6.

The box-shaped element 60 is preferably made of polymeric material, such as for example polyamide.

The box-shaped element 60 is adapted to removably couple with the box-shaped element 70.

Figure 6B:
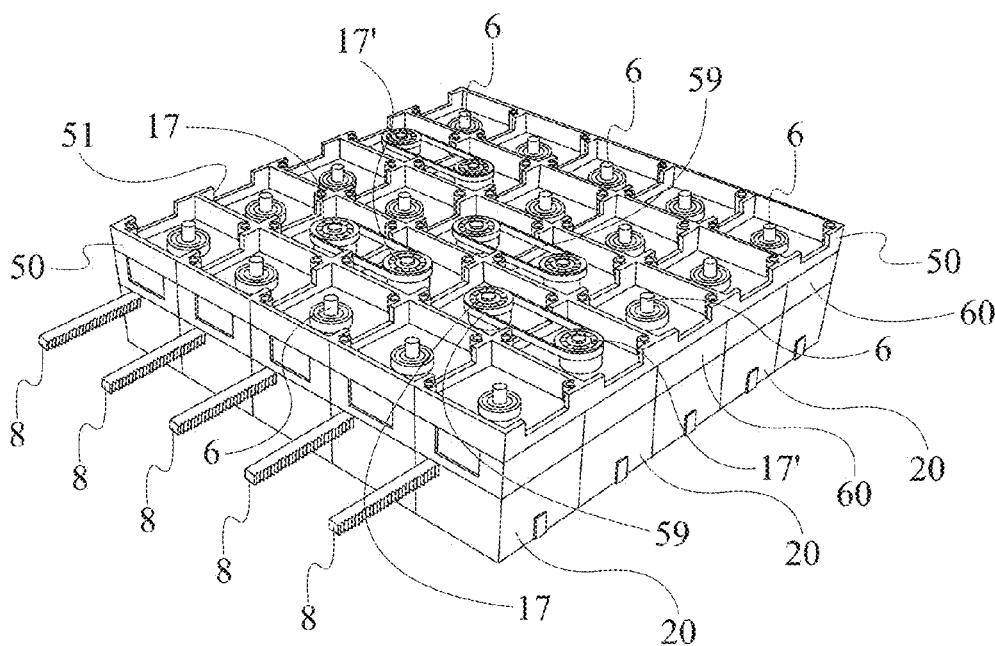

The transferring assembly 10 shown in figures advantageously comprises at least one second transferring assembly of the motion in the cross direction to transfer the rotary motion of the rotating support shaft 6 of a first transferring unit 10 to a support shaft 6 of a second transferring unit 10 arranged adjacent the first one in the cross direction, better shown in FIG. 6b.

That is to say in a direction crossing the primary direction F.

For this purpose, the second transferring assembly of the motion in the cross direction comprises at least one fifth pulley 17 keyed on the rotating support shaft 6 of the first transferring unit 10, at least one sixth pulley 17' combined with a second rotating support shaft 6 of a transferring unit 10 adjacent in the cross direction; and at least one belt and/or chain to transmit the motion from the fifth pulley 17 to the sixth pulley 17'.

The second transferring assembly of the motion in the cross direction is comprised in a parallelepiped-like box shaped element 50 and has a window 51 to allow the drive belt to come out and come back.

The box-shaped element 50 has a central hole for the shaft 6 and a precision bearing coupled with the shaft 6.

The box-shaped element 50 is preferably made of plastics, such as for example polyamide.

The box-shaped element 50 is adapted to removably couple with the box-shaped element 60.

The present invention has been described referring to some embodiments. To the embodiments herein represented in detail may be made various modifications, anyway remaining in the protection scope of the invention, defined by the following claims.

The invention claimed is:

1. A transferring assembly (2, 2') for displacing the products conveyed by a conveying system (100) from a primary feed direction (F) to a secondary direction; said transferring assembly (2, 2') comprising:

a plurality of transferring units (10) arranged adjacent in the cross direction and in the axially direction and adapted to form a conveying plane; each transferring unit (10) comprising at least one conveying element that rotates around an axis of transversal rotation (X-X);

at least one activating device of the rotation of said at least one conveying element to drive the angular rotation of said axis of transversal rotation (X-X) with respect to an axis substantially orthogonal to the primary direction and to said axis of transversal rotation (X-X), wherein, each axis of transversal rotation (X-X) of each transferring unit (10) is adapted to angularly rotate, with respect to an axis substantially orthogonal to the primary direction (F) and to said axis of transversal rotation (X-X) driven by said activating device of the rotation, independently with respect to the axis of transversal rotation (X-X) of the transferring unit (10) that is transversally adjacent and each transferring unit (10) moves together with the transfer unit (10) adjacent in the axial direction, said activating device of the rotation of said at least one conveying element comprises:
at least one retaining element (26) operatively combined with said at least one conveying element;
at least one rack (8) and at least one gear wheel (7) coupled to said rack (8);
said gear wheel (7) being operatively coupled to the retaining element (26) so that the translation of said rack (8) causes the rotation of said retaining element (26) and, accordingly, an angular rotation of the rotating conveying element;
at least one motor connected to said rack (8) to drive the translation thereof, wherein said at least one conveying element that rotates around an axis of transversal rotation (X-X) comprises at least one roller (3) rotating around an axis of transversal rotation (X-X);

a second actuating device of the rotation of said at least one rotatable conveying element about said transverse rotation axis (X-X) comprising a rotatable supporting shaft (6) functionally associated with said at least one conveying element and to a motor; and at least one first transferring assembly (11) of the motion in the axial direction to transfer the rotary motion of the rotating support shaft (6) of a first transferring unit (10) to a support shaft (6) of a second transferring unit (10) arranged adjacent in a direction parallel or coincident with the primary feed direction (F).

2. The transferring assembly (10) according to claim 1, wherein said axis of transversal rotation (X-X) is identified by at least one shaft (4).

3. The transferring assembly (2, 2') according to claim 2, wherein the transfer units (10) adjacent in the axial direction are associated with the same rack (8) which determines the rotation of the respective shafts (4).

4. The transferring assembly (2, 2') according to claim 2, wherein each transferring unit (10) comprises at least two adjacent rollers (3, 3') adapted to rotate around the same rotation shaft (4).

5. The transferring assembly (2, 2') according to claim 2, further comprising a second actuating device of the rotation of said at least one rotatable conveying element about said transverse rotation axis (X-X) comprising a rotatable supporting shaft (6) functionally associated with said at least one conveying element and to a motor.

6. The transferring assembly (2, 2') according to claim 1, wherein the transfer units (10) adjacent in the axial direction are associated with the same rack (8) which determines the rotation of the respective shafts (4).

7. The transferring assembly (2, 2') according to claim 6, wherein said at least one motor is a stepper motor or a linear motor or a pneumatic cylinder coupled by a transmission member to said rack (8) for the rotation of the retaining element (26) around its own vertical axis Z-Z.

8. The transferring assembly (2, 2') according to claim 1, wherein each transferring unit (10) comprises at least two adjacent rollers (3, 3') adapted to rotate around the same rotation shaft (4).

9. The transferring assembly (2, 2') according to claim 1, wherein said rotating support shaft (6) is combined, by a transmission device, with said rotation shaft (4) on which said at least one roller (3) is keyed.

10. The transferring assembly (2, 2') according to claim 9, wherein each transmission device comprises a first gear wheel (24) keyed on said rotating support shaft (6) and coupled to a second gear wheel (26) in its turn coupled to said rotation shaft (4).

11. The transferring assembly (2, 2') according to claim 1, wherein said first transferring assembly (11) of motion in the axial direction comprises:
at least one first pulley (12) keyed on said rotating support shaft (6) of said first transferring unit (10), at least one second pulley (13) combined with a second rotating support shaft (6) of a transferring unit (10) adjacent in the axial direction; and
at least one belt and/or chain to transmit the motion from said first pulley (12) to said second pulley (13).

12. The transferring assembly (2, 2') according to claim 11, wherein said first transferring assembly (11) of motion in the axial direction further comprises a third and a fourth pulley:
said first and third pulley (12, 13) being keyed on said rotating support shaft (6) of a first transferring unit (10);
said first pulley (12) being combined to a second pulley (13) of a rotating support shaft (6) of a transferring unit adjacent in the axial direction;
said third pulley (14) being combined to a fourth pulley (15) of a rotating support shaft (6) of a transferring unit (10) adjacent in the axial direction;
said second pulley (13) and said fourth pulley (15) being respectively combined with two transferring units (10) axially opposed with respect to the transferring unit comprising the first pulley (12) and the third pulley (14).

13. The transferring assembly (2, 2') according to according to claim 1, wherein the rollers (3,3 ') are associated by means of a transmission device to a rotatable support shaft (6) is in turn connected to at least a second motor disposed below each transferring assembly (10,10').

14. A transferring assembly (2, 2') for displacing the products conveyed by a conveying system (100) from a primary feed direction (F) to a secondary direction; said transferring assembly (2, 2') comprising:
a plurality of transferring units (10) arranged adjacent in the cross direction and in the axially direction and adapted to form a conveying plane; each transferring unit (10) comprising at least one conveying element that rotates around an axis of transversal rotation (X-X);
at least one activating device of the rotation of said at least one conveying element to drive the angular rotation of said axis of transversal rotation (X-X) with respect to an axis substantially orthogonal to the primary direction and to said axis of transversal rotation (X-X), wherein, each axis of transversal rotation (X-X) of each transferring unit (10) is adapted to angularly rotate, with respect to an axis substantially orthogonal to the primary direction (F) and to said axis of transversal rotation (X-X) driven by said activating device of the rotation, independently with respect to the axis of transversal rotation (X-X) of the transferring unit (10) that is transversally adjacent and each transferring unit (10) moves together with the transfer unit (10) adjacent in the axial direction, said activating device of the rotation of said at least one conveying element comprises:
- at least one retaining element (26) operatively combined with said at least one conveying element;
- at least one rack (8) and at least one gear wheel (7) coupled to said rack (8);
- said gear wheel (7) being operatively coupled to the retaining element (26) so that the translation of said rack (8) causes the rotation of said retaining element (26) and, accordingly, an angular rotation of the rotating conveying element;
- at least one motor connected to said rack (8) to drive the translation thereof, wherein said at least one conveying element that rotates around an axis of transversal rotation (X-X) comprises at least one roller (3) rotating around an axis of transversal rotation (X-X);

a second actuating device of the rotation of said at least one rotatable conveying element about said transverse rotation axis (X-X) comprising a rotatable supporting shaft (6) functionally associated with said at least one conveying element and to a motor; and at least one second transferring assembly of the motion in the cross direction to transfer the rotary motion of the rotating support shaft (6) of a first transferring unit (10) to a support shaft (6) of a second transferring unit (10) arranged adjacent in the cross direction.

15. The transferring assembly (2, 2') according to claim 14, wherein said second transferring assembly of motion in the cross direction comprises:
- at least one fifth pulley (17) keyed on said rotating support shaft (6) of said first transferring unit (10), at least one sixth pulley (18) combined with a second rotating support shaft of an omnidirectionally-transferring unit adjacent in the cross direction; and
- at least one belt and/or chain to transmit the motion from said fifth pulley (17) to said sixth pulley (18).

16. The transferring assembly (10) according to claim 14, wherein said axis of transversal rotation (X-X) is identified by at least one shaft (4).

17. The transferring assembly (2, 2') according to claim 14, wherein the transfer units (10) adjacent in the axial direction are associated with the same rack (8) which determines the rotation of the respective shafts (4).

* * * * *

UNITED STATES PATENT AND TRADEMARK OFFICE
CERTIFICATE OF CORRECTION

PATENT NO. : 9,878,856 B2
APPLICATION NO. : 15/113284
DATED : January 30, 2018
INVENTOR(S) : Dieter Specht It is certified that error appears in the above-identified patent and that said Letters Patent is hereby corrected as shown below:

On the Title Page

Left Column, above the line that reads:
"(51) Int. Cl."

Item (30) should be inserted:
--(30) Foreign Application Priority Data
Feb. 12, 2014    (IT)................................RM2014A000060--

Signed and Sealed this
Fifteenth Day of May, 2018

Andrei Iancu
*Director of the United States Patent and Trademark Office*